United States Patent
Kogure et al.

(10) Patent No.: US 6,907,778 B2
(45) Date of Patent: Jun. 21, 2005

(54) APPARATUS AND METHOD OF JUDGING ROAD SURFACE CONDITIONS FOR VEHICLE

(75) Inventors: Masaru Kogure, Tokyo (JP); Eiji Shibata, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/921,232

(22) Filed: Aug. 19, 2004

(65) Prior Publication Data

US 2005/0044944 A1     Mar. 3, 2005

(30) Foreign Application Priority Data

| Aug. 26, 2003 | (JP) | .......................... P2003-302000 |
| Oct. 20, 2003 | (JP) | .......................... P2003-359672 |
| Oct. 21, 2003 | (JP) | .......................... P2003-360164 |

(51) Int. Cl.$^7$ ............................................ G01M 17/02
(52) U.S. Cl. ..................................................... 73/146
(58) Field of Search .............................. 73/146, 146.5, 73/7–9; 340/442–447

(56) References Cited

U.S. PATENT DOCUMENTS 4,774,667 A * 9/1988 Kuraoka et al. .............. 701/78

FOREIGN PATENT DOCUMENTS

| JP | 9-188114 | 7/1997 |
| JP | 2003-237558 | 8/2003 |

* cited by examiner

Primary Examiner—William Oen
(74) Attorney, Agent, or Firm—McGinn & Gibb, PLLC

(57) ABSTRACT

A road surface condition judging apparatus of a vehicle includes means for detecting wheel speeds of respective wheels, means for calculating a vehicle speed of the vehicle based on the wheel speeds, means for calculating a deceleration of the vehicle, slip ratio difference calculating means for calculating a difference of slip ratios between front wheels and rear wheels based on the wheel speeds of the respective wheels and the vehicle speed, tire judgment value establishing means for variably establishing a tire judgment value, tire type judging means for judging a tire type of the wheels based on the tire judgment value, grip threshold value establishing means for variably establishing a grip threshold value in accordance with the tire type and road surface judging means for judging a road surface condition based on a comparison of the difference of slip ratios with the grip threshold value.

38 Claims, 10 Drawing Sheets

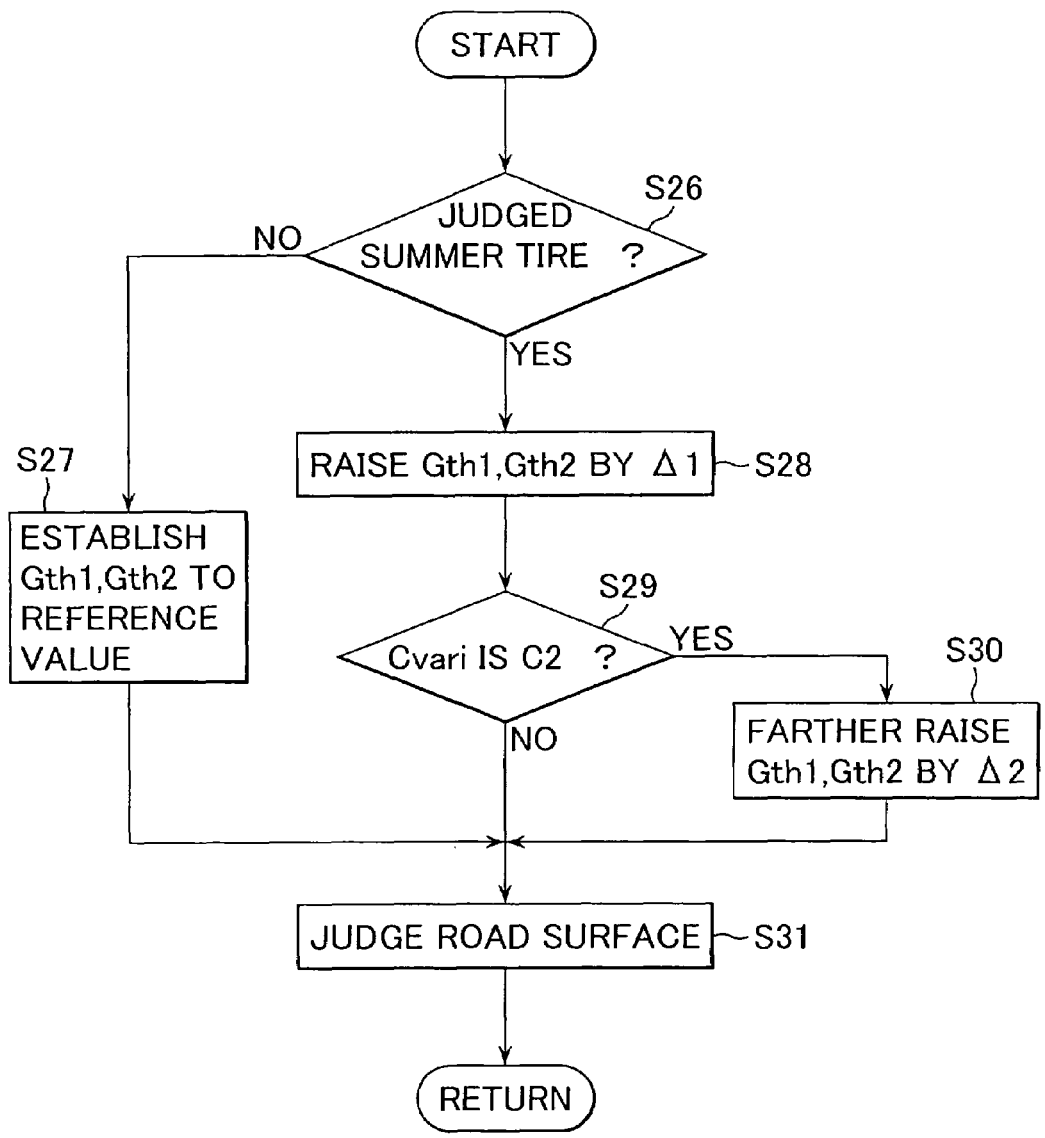

US 6,907,778 B2

APPARATUS AND METHOD OF JUDGING ROAD SURFACE CONDITIONS FOR VEHICLE

BACKGROUND OF THE INVENTION

1. Field of the Invention

The present invention relates to an apparatus and method for judging road surface conditions between a road surface and wheels of a vehicle and particularly to an apparatus and method for judging grip conditions between road a surface and tires.

2. Discussion of Related Arts

In recent years, when control parameters are calculated in miscellaneous vehicle control strategies such as traction control, braking force control and torque distribution control, friction coefficient(s) on road surface and grip conditions between wheel and road surface are frequently referred to. In performing such vehicle controls, it is of importance to make a correct judgment of road surface conditions of a road on which a vehicle presently travels in order to enhance the accuracy of the vehicle controls. However, in case where the vehicle travels on the same road surface with different types of tire, the road surface is erroneously judged. Hence, it is necessary to know a type of tires (summer tire, studless tire etc.) which a vehicle is equipped with before making the judgment of road surface conditions or grip conditions.

For example, Japanese Patent Application Laid-open No. Toku-Kai-Hei 09-188114 (JP-A-09-188114) discloses a method of identifying the type of tire. In which, respective wheel speeds of four wheels and longitudinal acceleration of the vehicle are measured and the ratio of the rotation speed of a front wheel to the rotation speed of a rear wheel is calculated based on these measured values and the type of the tires installed on the vehicle is judged by comparing the function of acceleration—front and rear wheel speed ratio with the calculated the ratio between front wheel speed and the rear wheel speed. The function of acceleration—front and rear wheel speed ratio is formed based on data of the ratio between front wheel speed and rear wheel speed for every specified acceleration with respect to the tires whose type is known.

SUMMARY OF THE INVENTION

It is an object of the present invention to provide a tire type judging apparatus capable of judging a type of tires installed on an own vehicle with accuracy and it is a further object of the present invention to provide a road surface condition judging apparatus capable of accurately judging road surface conditions using the type of tires judged by the tire judging apparatus according to the present invention.

In order to attain the objects, a road surface condition judging apparatus of a vehicle for judging a grip condition between a road surface and wheels, comprises means for detecting wheel speeds of the respective wheels, means for calculating a vehicle speed of the vehicle based on the wheel speeds, means for calculating a deceleration of the vehicle based on a change of the vehicle speed within a specified time, slip ratio difference calculating means for calculating a difference of slip ratios between front wheels and rear wheels based on the wheel speeds of the respective wheels and the vehicle speed, slip ratio difference mean value calculating means for calculating a mean value of the difference of slip ratios within a specified time, tire judgment value establishing means for variably establishing a tire judgment value on which a type of tires is judged to a first reference value when it is judged that there is no difference of dynamic radiuses between front and rear wheels and the tire judgment value is established to a second reference value when it is judged that there is a difference of dynamic radiuses between front and rear wheels, tire type judging means for judging a type of tires of the wheels to be a summer tire or a studless tire when a preestablished condition is satisfied by comparing the mean value with the tire judgment value, grip threshold value establishing means for variably establishing a grip threshold value according to the tire type and a difference of dynamic radiuses between front and rear wheels, a road surface judging means for judging a road surface condition between the road surface and the wheels by comparing the difference of slip ratios with the grip threshold value.

BRIEF DESCRIPTION OF THE DRAWINGS

FIG. 10 is a flowchart showing a process for judging a road surface condition.

DETAILED DESCRIPTION OF THE PREFERRED EMBODIMENTS

First, before describing the tire type judging apparatus according to the present invention, the concept of the judging method of a type of tires will be described. The judgment of a type of tires is made based on differences of slip ratios between front and rear wheels Sfr. Also, the judgment of the road surface condition or the grip condition of tire which will be described hereinafter, are made based on differences of slip ratios between front and rear wheels Sfr. The difference of slip ratios Sfr is a difference between a slip ratio Sf of a front wheel and a slip ratio Sr of a rear wheel.

$$Sfr = Sf - Sr \quad (1)$$

The slip ratio S of a certain wheel is expressed by a ratio of a difference (positive value) between a wheel speed v and a vehicle speed Vb to the vehicle speed Vb. The slip ratio S is automatically calculated from the following basic formula (2). In case where the unit of the wheel speed v corresponding to the peripheral velocity differs from that of the vehicle speed (for example, rpm and km/h), it is necessary to unify them to either of these units.

$$S=(v-Vb)/Vb \text{ (or } S=(Vb-v)/Vb) \quad (2)$$

The formula (1) can be rewritten as a formula (3) using the formula (2).

$$Sfr=(vf-vr)/Vb \quad (3)$$

where vf is the wheel speed of a front wheel and vr is the wheel speed of a rear wheel on the assumption that the left and right front wheels, the left and right rear wheels are regarded as one wheel, respectively.

Figure 3:
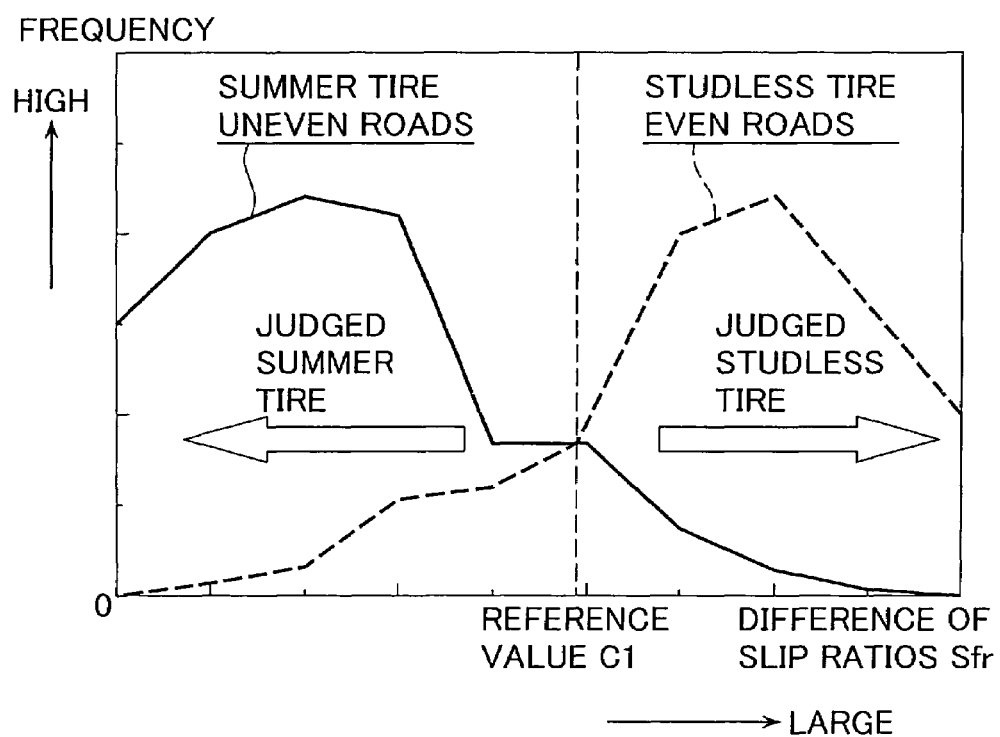
FIG. 3 is an explanatory diagram showing frequency distributions of differences of slip ratios according to the difference of tires.

The concept of the tire type judgment will be described below. FIG. 3 is a diagram showing frequency distributions of the difference of slip ratios Sfr according to the difference of the type of tires. Referring to FIG. 3, solid lines indicate a frequency distribution of the difference of slip ratios Sfr when the vehicle travels on uneven roads with summer tires and broken lines indicate a frequency distribution of the difference of slip ratios Sfr when the vehicle travels on even roads with studless tires.

As understood from the drawing, in case where the vehicle is equipped with the summer tires, the region where the difference of slip ratios Sfr frequently appears is a region in which the difference of slip ratios Sfr is smaller than a reference value C1. On the other hand, in case where the vehicle is equipped with the studless tires, the region where the difference of slip ratios Sfr frequently appears is a region in which the difference of slip ratios Sfr is larger than the reference value C1. According to experiments or simulations, in case where the brake pedal is depressed and deceleration Gx of the vehicle is within a specified range 0.2G to 0.3G, such a characteristic of the frequency distribution as illustrated in FIG. 3 is obtained. In case where deceleration Gx is smaller than 0.2G, there is almost no distributional difference between the difference of slip ratios Sfr when being equipped with studless tires and the difference of slip ratios Sfr when being equipped with summer tires. On the other hand, in case where deceleration Gx is larger than 0.3G, the difference of slip ratios Sfr when being equipped with studless tires relatively becomes large and as a result it is difficult to obtain such a definite frequency distribution as being able to define the type of tires. Accordingly, the deceleration capable of judging with statistically high accuracy can be established to 0.2G to 0.3G.

The difference of slip ratios between front and rear wheels Sfr is monitored, under the condition that the brake pedal is depressed and the deceleration Gx is within a range 0.2G to 0.3G. This condition is referred to as "execution condition" hereinafter. Since a region (indicated by solid lines in FIG. 3) over which the differences of slip ratios Sfr when being equipped with summer tires are distributed, differs from a region (indicated by broken lines in FIG. 3) over which the differences of slip ratios Sfr when being equipped with studless tires are distributed, a reference value C1 can be established in a boundary of both regions. Thus, the monitored differences of slip ratios Sfr are compared with the reference value, that is, a tire judgment value C1. Since the region where the differences of slip ratios Sfr are distributed is already known for respective types of tires, it can be judged whether the type of tires is a summer type or a studless type by judging whether or not the differences of slip ratios Sfr are larger than the reference value, or tire judgment value C1 by referring to the known distribution region inherent to the type of tire. According to experiments or simulations, the tire judgment value C1 can be established at around 0.006 corresponding to the boundary between both regions under the execution condition. In comparing the differences of slip ratios Sfr with the tire judgment value C1, an instant value itself of the difference of slip ratios Sfr may be used. However, since the instant value may include effects of noises, mean values, most frequent values, sum total values within a specified time and the like may be used. In this embodiment, a mean value Sfra will be used hereinafter.

When the vehicle is equipped with summer tires, in case where the dynamic radius of the rear wheel changes on the basis of the dynamic radius of the front wheel, the region where the differences of slip ratios Sfr frequently appear has characteristics different from that of usual cases. The difference of dynamic radiuses between front and rear wheels is caused by the difference of temperature between front and rear wheels or the difference of inflation pressure between front and rear wheels. In this embodiment, the description of the difference of dynamic radiuses caused by inflation pressure will be omitted because the difference of dynamic radiuses caused by inflation pressure is based on the same reason as the difference caused by temperature. In this specification, the term "the change of the dynamic radius of the rear wheel on the basis of the dynamic radius of the front wheel (the difference of dynamic radiuses between front and rear wheels)" means that the dynamic radiuses of the front and rear wheels initially established by a driver are changed or deviated from initial set values by the temperature difference or inflation pressure difference between front and rear wheels. Accordingly, in case where there occurs a difference of dynamic radiuses between front and rear wheels as a result of the initial set, the change or deviation of the dynamic radiuses of the front and rear wheels from these initial set values is referred to as "the change of the dynamic radius of the rear wheels on the basis of the dynamic radius of the front wheel".

The reason why there occurs a difference of temperature between front and rear wheels is that the front tire is warmed by hot air coming into a tire house from the engine room when the radiator fan operates or by hot air generated from brakes applied while the vehicle travels on a long downgrade. In particular, in case of the vehicle parked with a radiator fan operative, the temperature of the front tire becomes higher than that of the rear tire. When the vehicle restarts the traveling in this state, the difference of wheel speeds between front and rear wheels caused by the difference of dynamic radiuses between front and rear wheels, increases. As a result, in case where the vehicle is equipped with summer tires, the difference of slip ratios Sfr becomes relatively large and the frequency region of summer tire tends to shift to the frequency region side of studless tire. Particularly, in case where the temperature of the front wheel is 40° C. and more and the temperature difference between front and rear wheels is 10° C. and more, such tendency is outstanding.

Figure 5:
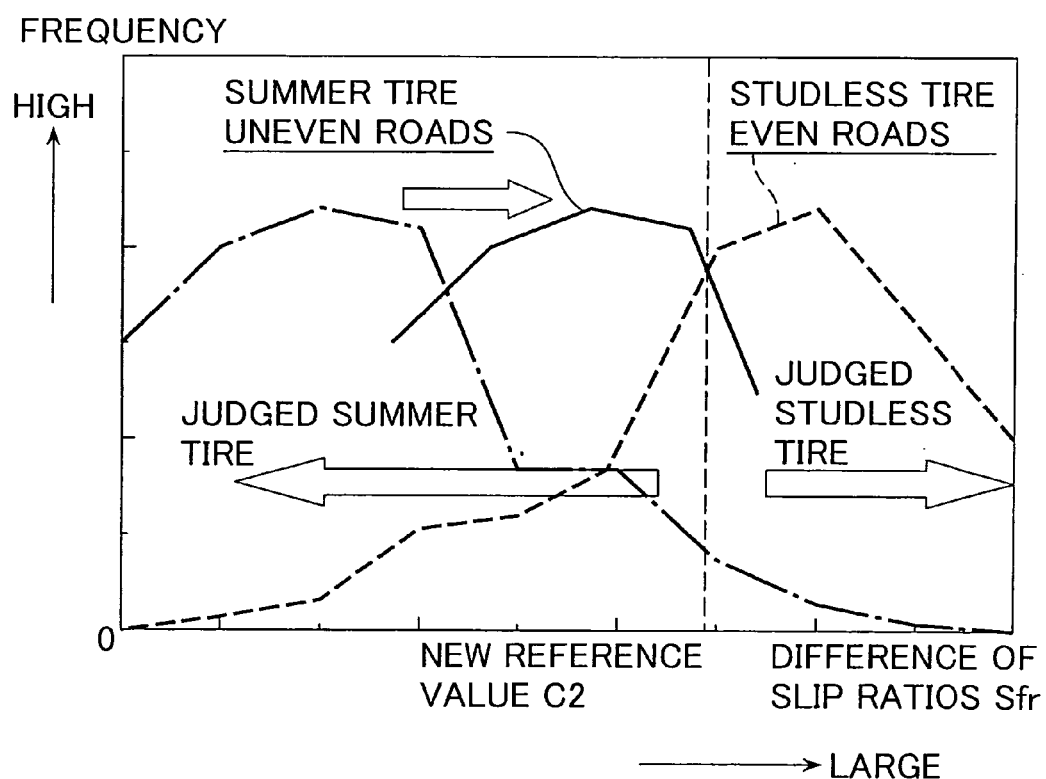
FIG. 5 is a diagram showing a change of a frequency distribution of differences of slip ratios, in case where there is a difference of dynamic radiuses between front and rear wheels.

FIG. 5 is a frequency distribution diagram showing the change of frequency distribution of the difference of slip ratios Sfr when the vehicle is equipped with summer tires, in case where there occurs a difference of dynamic radiuses between front and rear wheels. In the drawing, the frequency distribution of summer tires in a normal case (corresponding to FIG. 3) is shown by one-dot chain lines and the frequency distribution of summer tires in case where there occurs a difference of dynamic radiuses between front and rear wheels is shown by solid lines. In case where there occurs no difference of dynamic radiuses between front and rear wheels, the average of the differences of slip ratios Sfr when the vehicle is equipped with summer tires is approximately 0.002. On the other hand, in case where there occurs a difference of dynamic radiuses between front and rear wheels, the average of the differences of slip ratios Sfr when the vehicle is equipped with summer tires is approximately 0.006. Hence, in case where there occurs a difference of dynamic radiuses between front and rear wheels, in spite of that fact that the vehicle is equipped with summer tires, sometimes the difference of slip ratios Sfr becomes larger than the reference value C1. As a result, there is possibility that the type of tire is erroneously judged to be a studless tire.

Taking this change of the difference of slip ratios Sfr into consideration, it is judged whether or not there occurs a difference of dynamic radiuses between front and rear wheels by judging whether or not the present value of the difference of slip ratios Sfr shifts over a specified threshold value preestablished on the basis of the mean value 0.002 of the frequency distribution of the difference of slip ratios Sfr when the vehicle is equipped with summer tires (solid lines in FIG. 3) toward the frequency region side of the studless tires. As a result of studies through experiments or simulations, the threshold value for judging whether or not there occurs a difference of dynamic radiuses can be established to approximate 0.004. Further, in case where it is judged that there occurs a difference of dynamic radiuses between front and rear wheels, this tire judgment value is changed from the reference value C1 to a new reference value C2 on the frequency region side of studless tires. Since now the tire judgment value becomes a variable parameter, the tire judgment value will be referred to as Cvari hereinafter. This new reference value C2 can be established at a value (for example 0.008) corresponding to the boundary between the frequency region of summer tires (solid lines in FIG. 5) and the frequency region of studless tires (broken lines in FIG. 5). Thus, even in case where the vehicle is equipped with summer tires and there occurs a difference of dynamic radiuses between front and rear wheels, the type of tire can be inhibited from being erroneously judged.

On the other hand, in case where there occurs no difference of dynamic radiuses between front and rear wheels, the tire judgment value Cvari must be returned to the reference value C1. In this embodiment, if the following conditions 1 or 2 are satisfied, the tire judgment value Cvari is changed from the new reference value C2 to the reference value C1.

Condition 1: the mean value of the differences of slip ratios Sfr is 0.004 and smaller when the vehicle decelerates at a deceleration range 0.2G to 0.3G.

If the condition 1 is satisfied, it is judged that there occurs no difference of dynamic radiuses between front and rear wheels.

Condition 2: the vehicle travels at a specified vehicle speed (for example 50 km/h) or more during a specified time (for example 5 minutes).

If the condition 2 is satisfied, because the temperature of the front wheels balances with the temperature of the rear wheel and the difference of temperature between front and rear wheels disappears during the traveling, it is judged that there occurs no difference of dynamic radiuses between front and rear wheels.

In case where the vehicle wears studless tires, the problem is hardly caused by the difference of dynamic radiuses between front and rear wheels. Accordingly, if the vehicle wears studless tires, the tire judgment value Cvari is fixed to the reference value C1.

Next, the concept of the judging method of the road surface condition, that is, the grip condition of tires will be described.

Figure 8:
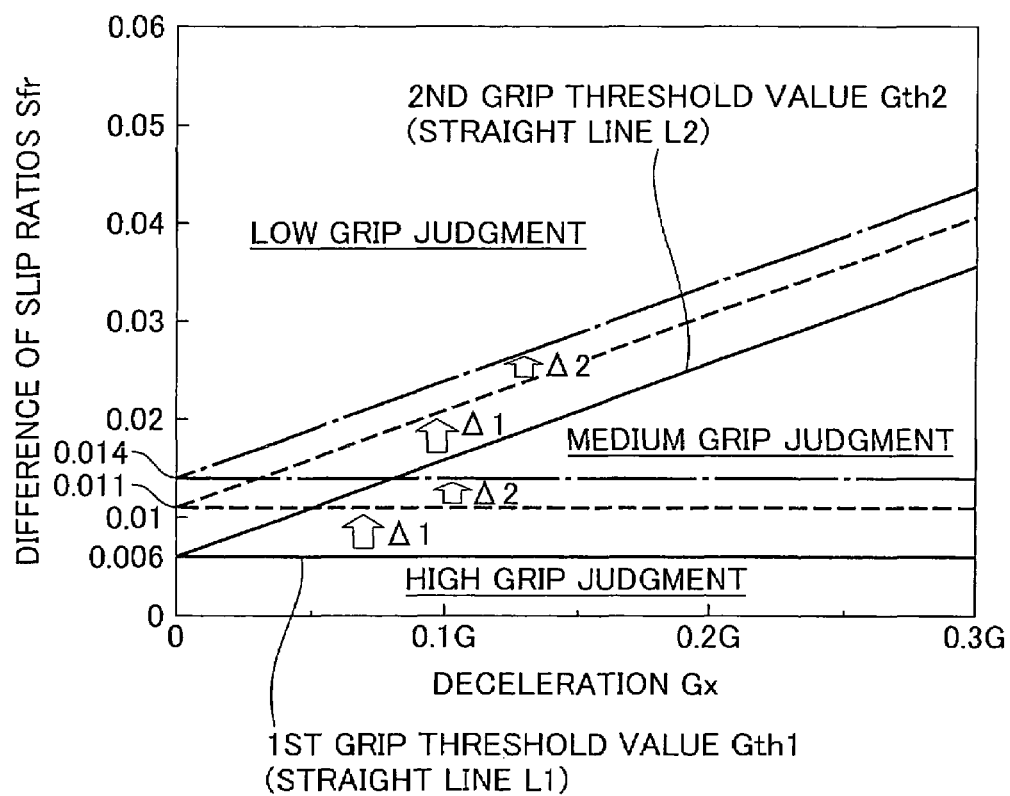
FIG. 8 is an explanatory diagram of grip threshold values according to a third embodiment.

FIG. 8 is an explanatory view of grip threshold values for judging a grip condition of tires. In the drawing, the grip threshold values (judgment criteria of grip condition) are indicated by straight lines L1, L2 on the graph of a difference of slip ratios Sfr versus to deceleration Gx. In a coordinate system having an abscissa representing a decereation Gx and an ordinate representing the difference of slip ratios Sfr, three regions are formed by boundary lines L1, L2 and the respective regions have preestablished different grip conditions. The grip condition is judged by identifying a region where the difference of slip ratios Sfr exists versus to a given deceleration Gx.

Specifically, the straight line L1 is a constant in which the difference of slip ratios Sfr is constant regardless of the deceleration Gx. In case where a present value of the difference of slip ratios Sfr of a vehicle traveling in a deceleration Gx is smaller than a first grip threshold value Gth1 corresponding to the straight line L1, the grip condition is judged to be a high grip condition, that is, a friction between wheel and road surface is large (high grip judgment). On the other hand, the straight line L2 is expressed as a linear function in which the difference of slip ratios Sfr increases proportional to the deceleration Gx. In this case, if a present value of the difference of slip ratios Sfr between front and rear wheels is larger than a second grip threshold value Gth2 corresponding to the straight line L2, the grip condition is judged to be a low grip condition, that is, a friction between wheel and road surface is small (low grip judgment). Further, in case where the present value of the difference of slip ratios Sfr between front and rear wheels exists between the straight line L1 and the straight line L2, the grip condition is judged to be a medium condition, that is, the friction between wheel and road surface is medium (medium grip judgment).

In judging road surface conditions, these first and second grip threshold values Gth1, Gth2 are determined beforehand by statistically processed results of experiments or simulations. Specifically, when a vehicle travels under miscellaneous road conditions (grip conditions), the deceleration Gx and the difference of slip ratios Sfr are measured at braking for every type of tires. Then, frequency distributions with respect to the difference of slip ratios Sfr are prepared from these measurement results. Different grip conditions (different road surface conditions) make distributional differences of the difference of slip ratios Sfr. Then, grip conditions, for example, high grip condition, medium grip conditions and low grip condition, are defined for respective frequency distributions. That is, the boundaries between different grip conditions are the first and second grip threshold values Gth1, Gth2. That is, a plurality of values corresponding to the deceleration Gx of the vehicle are established to the first and second grip threshold values Gth1, Gth2. For example, the difference of slip ratios Sfr has been processed statistically when traveling using two types of tires, studless tires and non-studless tires on road surfaces having miscellaneous grip conditions. The non-studless tires are tires harder than studless tires and so-called summer tires or all season tires belong to the non-stusless tires. Hereinafter, the non-studless tire will be also referred to as "summer tire". In this case, as shown by solid line in FIG. 8, the first grip threshold value Gth1 is around 0.006 and the second grip threshold value Gth2 is expressed as a linear function having an intercept 0.006 on the ordinate axis.

In case of a table having thus statistically derived grip threshold values Gth1, Gth2, when the vehicle travels on a new-fallen snow road or a frozen road with the studless tires, data appear characteristically in the low grip judgment region of the table. Further, when the vehicle travels on a packed snow road or a dry road, data appear characteristically in the medium grip judgment region. In case where the vehicle travels on a packed snow road, sometimes data appear in the high grip judgment region. On the other hand, in case where the vehicle travels on a dry road with summer tires, data appear in the high grip judgment region and in case where the vehicle travels on a road having a road surface with low friction coefficient (hereinafter referred to as low friction coefficient road), data appear more frequently in the medium grip judgment region or in the low grip judgment region according to the magnitude of the friction coefficient of the road.

The road surface is judged by comparing the first and second grip threshold values Gth1, Gth2 with the difference of slip ratios Sfr. Specifically, the difference of slip ratios Sfr is calculated when the vehicle decelerates at a deceleration Gx for example from 0.0G to 0.3G. Then, the calculated difference of slip ratios Sfr is compared with grip threshold values Gth1, Gth2 corresponding to a deceleration Gx and the grip condition between wheel and road surface is estimated based on the result of that comparison.

On the other hand, in case where the vehicle travels on uneven roads with summer tires, sometimes the difference of slip ratios Sfr becomes larger than the first grip threshold value Gth1 in spite of the fact that the actual grip condition is in a high grip condition. In this case, the grip condition is erroneously judged to be a medium grip condition. In order to reduce such erroneous judgments, it is necessary to enlarge the high grip judgment region with an eye to that the difference of slip ratios Sfr becomes larger than the first grip threshold value Gth1. According to the experiments or simulations, in case where the vehicle travels on uneven roads with summer tires, the first grip threshold value Gth1 comes to around 0.011. The difference of slip ratios Sfr appears more frequently in the high grip judgment region (refer to broken lines in FIG. 8) by relatively raising the grip threshold values Gth1, Gth2. Thus, even in case where the vehicle travels on uneven roads with summer tires, the grip condition is prevented from erroneously being judged by raising the grip threshold values Gth1, Gth2 (raised by $\Delta 1$). On the other hand, in case where the vehicle is equipped with the studless tires, such phenomenon does not occur, therefore the original grip threshold values Gth1, Gth2 should be used.

In case where the vehicle travels on uneven roads with summer tires, the first and second grip threshold values Gth1, Gth2 are relatively raised. However, in case where there occurs a difference of dynamic radiuses between front and rear wheels, even if the judgment of summer tires is properly performed, in some case, the difference of slip ratios Sfr becomes larger than the raised first grip threshold value Gth1. In this case, the result of the tire judgment is the medium grip judgment, this leading to an erroneous judgment of the grip condition. Hence, in case where there occurs a difference of dynamic radiuses between front and rear wheels, since it is predicted that the difference of slip ratios Sfr becomes larger than the first grip threshold value Gth1 (broken lines in FIG. 8), the difference of slip ratios Sfr is further raised by $\Delta 2$ so as to enlarge the high grip judgment region. According to experiments or simulations, the differences of slip ratios Sfr appear roughly in the high grip judgment region by raising the grip threshold values Gth1, Gth2 so that the grip threshold value Gth1 is around 0.014 (refer to one-dot chain lines in FIG. 8). As a result, even in case where the vehicle travels on uneven roads while there occurs a difference of dynamic radiuses between front and rear wheels, the grip condition is prevented from being erroneously judged, for example, to be the medium grip condition.

[First Embodiment]

Figure 1:
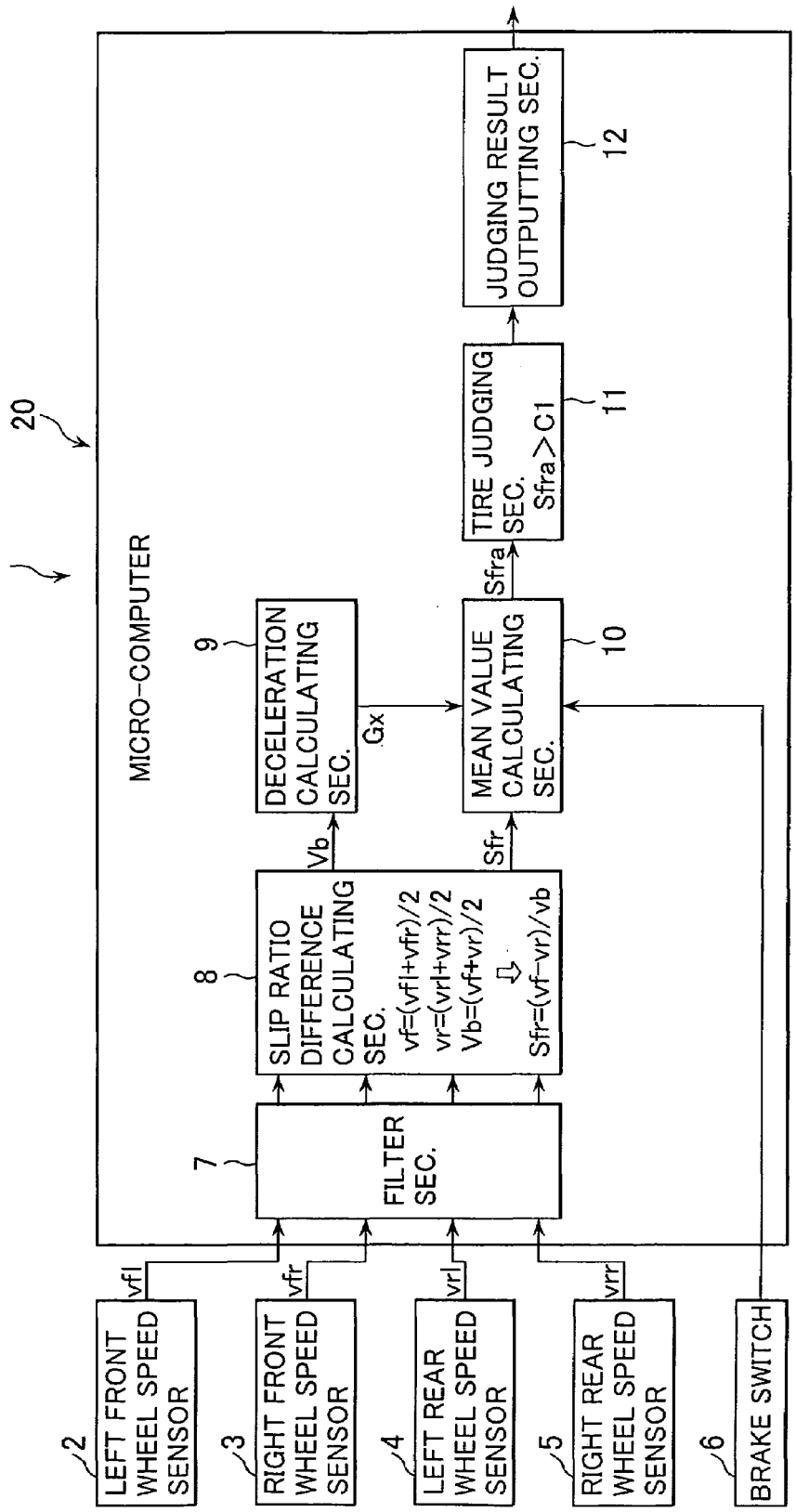
FIG. 1 is a block diagram of a tire type judging apparatus of a vehicle according to a first embodiment of the present invention.

Referring now to FIG. 1, reference numeral 1 denotes a tire type judging apparatus according to the first embodiment. The tire type judging apparatus 1 includes a tire type judging sextion 20 for judging the type of tire (studless tire or summer tire) according to a tire type judging program which will be described hereinafter. The tire type judging apparatus 1 is a micro-computer constituted by CPU, RAM, ROM, input and output interface and the like. The micro-computer performs miscellaneous calculations related to the judgment of the tire type by software processes according to the control program stored in ROM.

The tire type judging apparatus 1 inputs detecting signals from a left front wheel speed sensor 2, a right front wheel speed sensor 3, a left rear wheel speed sensor 4, a right rear wheel speed sensor 5 and a brake switch 6. The wheel speed sensors 2, 3, 4 and 5 are sensors for detecting a wheel speed (peripheral velocity) of respective wheels. The left front wheel speed sensor 2 detects a wheel speed vfl of a left front wheel, the right front wheel speed sensor 3 detects a wheel speed vfr of a left front wheel, the left rear wheel speed sensor 4 detects a wheel speed vrl of a left rear wheel, and the right rear wheel speed sensor 5 detects a wheel speed vrr of a right rear wheel. These wheel speed sensors 2 to 5 comprise, for example, a gear mounted on the center of the wheel and a magnetic sensor for detecting the rotation of the gear and output detecting signals according to the wheel speed. The brake switch 6 is for detecting whether or not a brake pedal is depressed and outputs an ON-signal when the brake pedal is depressed and outputs an OFF-signal when the brake pedal is not depressed.

The micro-computer for performing the judgment of tire type is functionally constituted by a filter section 7, a slip ratio difference calculating section 8, a deceleration calculating section 9, a slip ratio difference mean value calculating section 10, a tire judging section 11, and a judging result outputting section 12. The filter section 7 performs filter processes with respect to detecting signals indicative of the wheel speeds vfl, vfr, vrl, vrr detected by the wheel speed sensors 2, 3, 4, 5 of the respective wheels. The slip ratio difference calculating section 8 calculates a vehicle speed Vb based on the respective detecting signals subjected to the filter processes, that is, the wheel speeds vfl, vfr, vrl, vrr of the respective wheels and calculates a slip ratio Sf of the front wheel and a slip ratio Sr of the rear wheel based on the vehicle speed Vb and the wheel speeds vfl, vfr, vrl, vrr of the respective wheels.

Further, the slip ratio difference calculating section 8 calculates a difference of slip ratio between front and rear wheels Sfr based on these slip ratios Sf, Sr. On the other hand, the deceleration calculating section 9 calculates a deceleration Gx of the vehicle based on the change of the vehicle speed Vb per specified time. The slip ratio difference mean value calculating section 10 calculates a mean value Sfra indicating a tendency of time-versus differences of slip ratios Sfr calculated within a specified time. The tire judging section 11 judges the type of tire by comparing the calculated mean value Sfra with the tire judgment value C1 described before.

When the result of the judgment of the tire type is inputted from the tire judging section 11, the judging result outputting section 12 outputs this result to a road surface condition judging apparatus which will be described hereinbefore, a vehicle behavior control apparatus (not shown) and the like.

Figure 2:
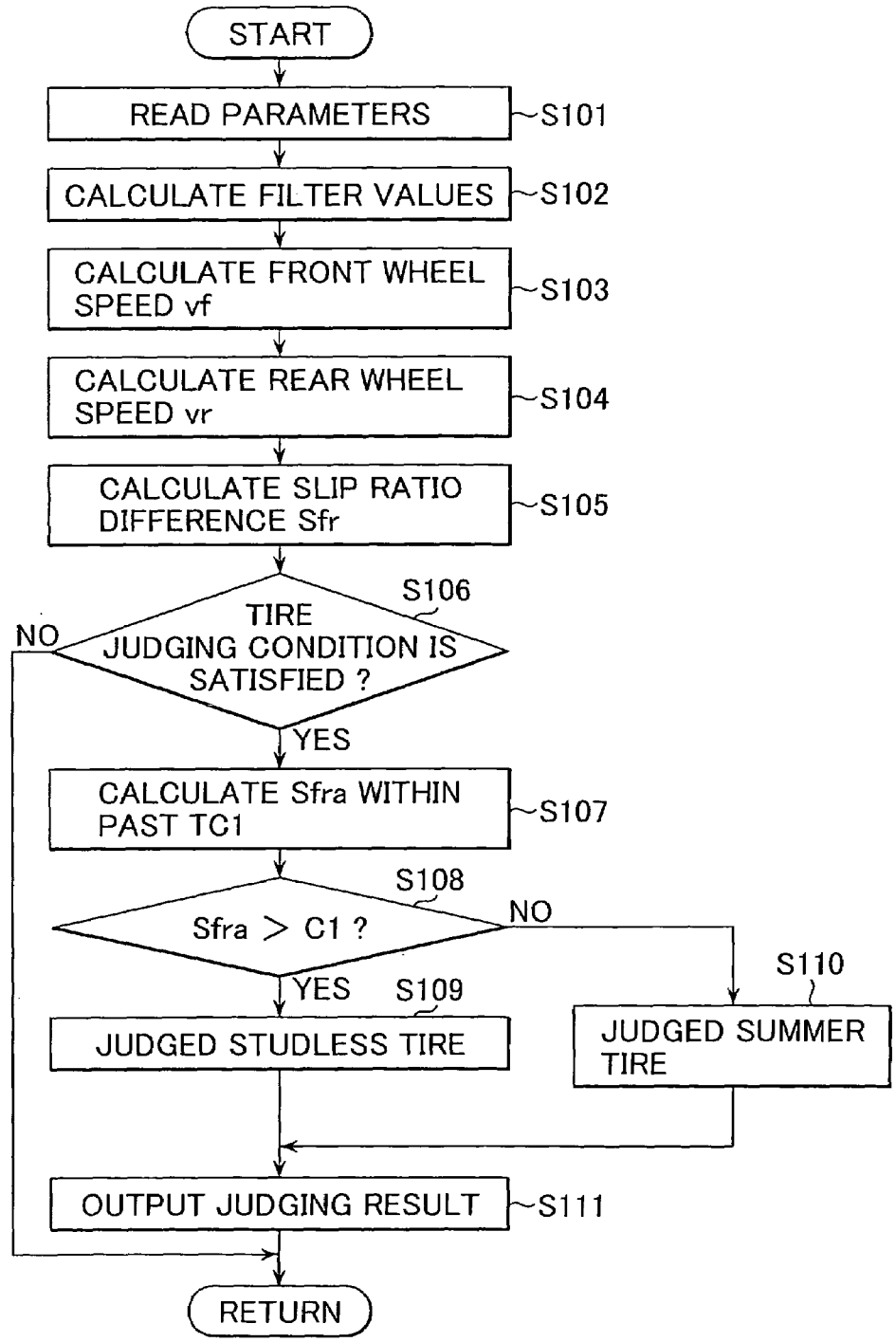
FIG. 2 is a flowchart showing a process for judging a type of tire according to a first embodiment.

The program for judging the type of tire executed in the tire judging section 11 will be described by referring to a flowchart of FIG. 2. First, at a step (hereinafter referred to as "S") 101, necessary parameters such as wheel speeds vfl, vfr, vrl, and vrr of the four wheels detected by the wheel speed sensors 2, 3, 4 and 5 are read.

Then, the program goes to S102 where the filter values of the wheel speeds vfl, vfr, vrl, and vrr are calculated, respectively.

Next, the program goes to S103 where the front wheel speed vf (=(vfl+vfr)/2) is calculated by calculating the mean value of the front wheel filter values.

Next, the program goes to S104 where similarly the rear wheel speed vr (=(vrl+vrr)/2) is calculated by calculating the mean value of the rear wheel filter values.

Next, the program goes to S105 where the vehicle speed Vb is calculated by averaging the front wheel speed vf calculated in S103 and the rear wheel speed vr calculated in S104 and calculates the difference of slip ratios between front and rear wheels Sfr in accordance with the aforesaid formula (3).

Then, the program goes to S106 where it is judged whether or not the tire judgment condition, that is, the condition that the vehicle is braked and the longitudinal deceleration Gx of the vehicle is within an preestablished range (for example, 0.2G to 0.3G), is satisfied. If the condition is not satisfied, the program leaves the routine and if satisfied, the program goes to S107.

When the program goes to S107 after it is judged that the tire judgment condition is satisfied, the mean value Sfra of the difference of slip ratios between front and rear wheels Sfr during a past specified time (for example, 1 sec.) is calculated and goes to S108.

At S108, the mean value Sfra of the difference of slip ratios between front and rear wheels Sfr is compared with the preestablished tire judgment value C1 and in case where the mean value Sfra of the difference of slip ratios between front and rear wheels Sfr is larger than the tire judgment value C1, the program goes to S109 where it is judged that the vehicle travels on even roads with studless tires.

On the other hand, as a result of the comparison at S108, in case where the mean value Sfra of the difference of slip ratios between front and rear wheels Sfr is smaller than the tire judgment value C1, the program goes to S110 where it is judged that the vehicle travels on uneven roads with summer tires.

After the tire type is judged at S109 or S110, the program goes to S111 where the judging result outputting section 12 outputs the result of the judgment of the tire type, leaving the routine.

Thus, according to the first embodiment, since the mean value Sfra of the difference of slip ratios between front and rear wheels Sfr, the statistic value, is compared with the preestablished tire judgment value C1, the type of tire can be judged instantly, accurately.

[Second Embodiment]

A second embodiment of the present invention differs from the first embodiment in the tire judgment value variably established according to the difference of dynamic radiuses between front and rear wheels. Accordingly, a tire type judging apparatus according to the second embodiment takes identical steps up to the calculation of the difference of slip ratios.

Figure 4:
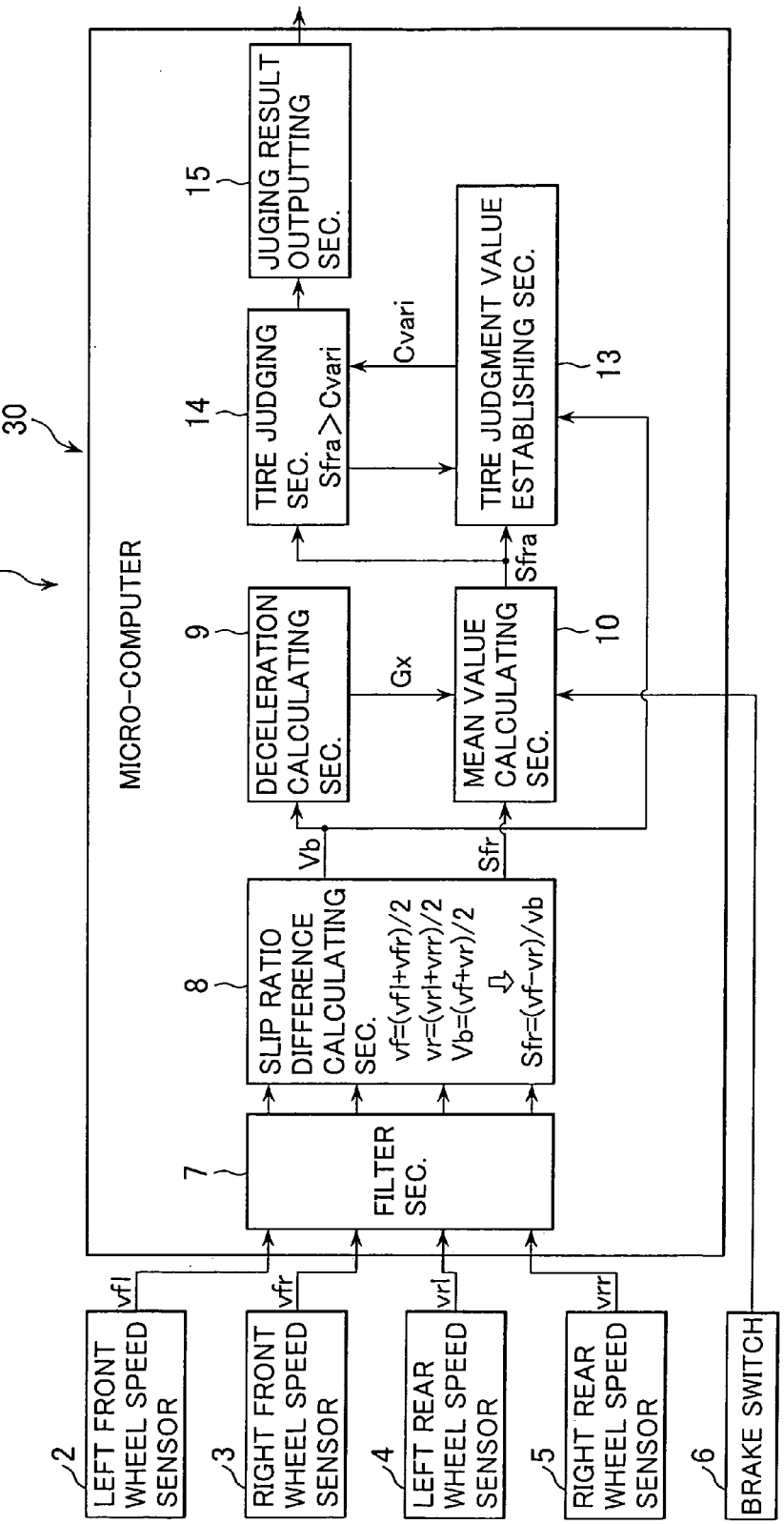
FIG. 4 is a block diagram of a tire type judging apparatus of a vehicle according to a second embodiment of the present invention.

Referring to FIG. 4, reference numeral 30 denotes a tire type judging apparatus according to the second embodiment. For the aforesaid reason, the description of the sections 7, 8, 9 and 10 having identical reference numerals to the first embodiment will be omitted.

The mean value Sfra of the difference of slip ratios Sfr is outputted from the difference of slip ratio mean value calculating section 10 to a tire reference value establishing section 13. The tire reference value establishing section 13 estimates the change of the dynamic radiuses of front and rear wheels based on the calculated mean value Sfra and establishes the tire judgment value Cvari described before. The tire judgment value Cvari is established based on the change of the dynamic radiuses of rear wheels on the basis of front wheels. The tire judging section 14 judges the type of tire by comparing the calculated mean value Sfra with the tire judgment value Cvari. Thus judged tire type is outputted from a judging result outputting section 15 to other control apparatuses such as a road surface condition judging apparatus, a vehicle behavior control apparatus and the like.

Figure 6:
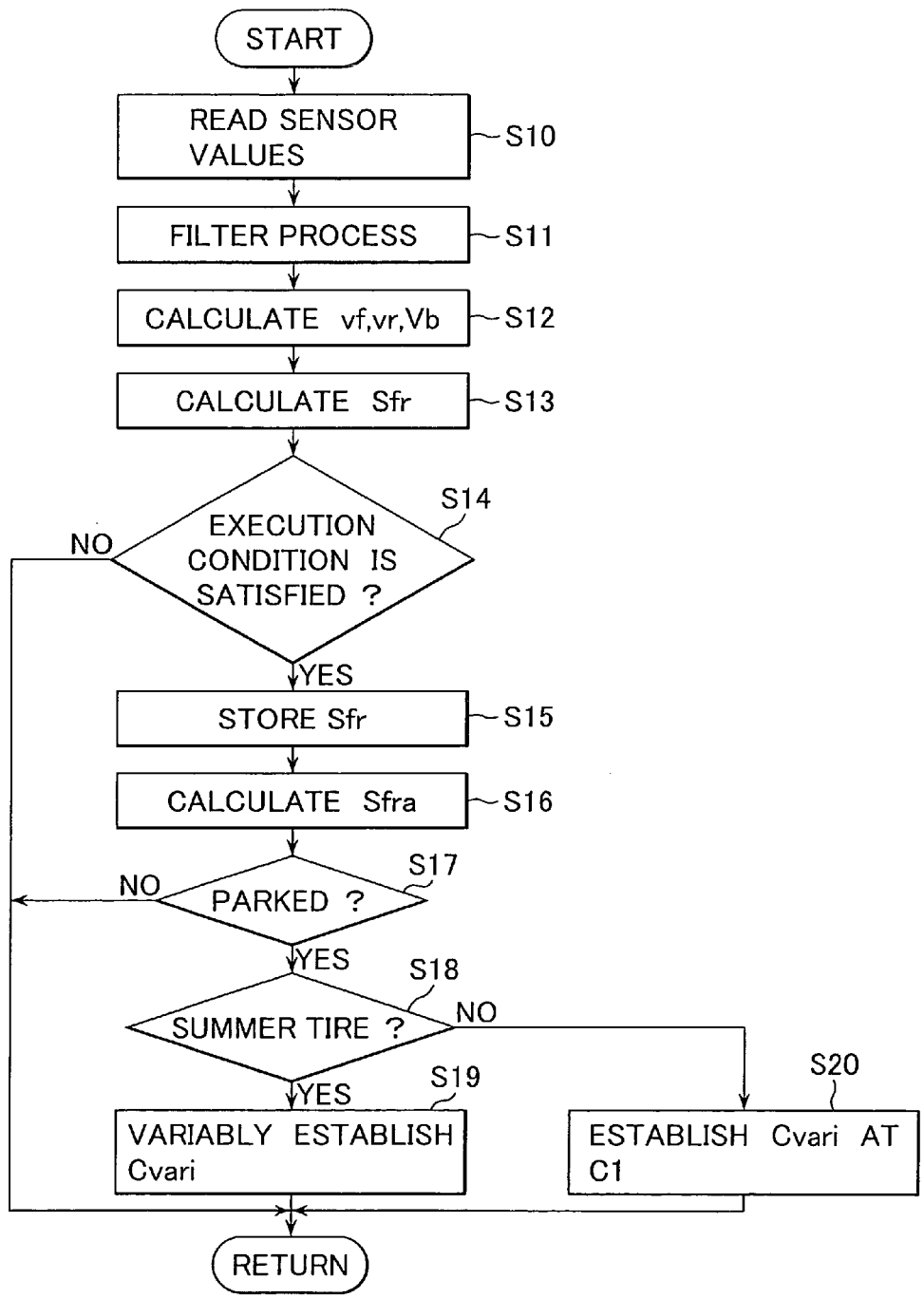
FIG. 6 is a flowchart showing a process for variably establishing a tire type judgment value.

Below, a process of the tire type judgment according to the second embodiment will be described. The tire type judgment process is executed at a specified time interval by the micro-computer in an order, firstly the establishment of tire judgment value Cvari, secondly the judgment of tire type. FIG. 6 is a flowchart showing a process of establishing a tire judgment value Cvari. First, at S10, detecting signals vfl, vfr, vrl, vrr from the respective wheel speed sensors 2 to 5 are read and at S11, a filter process is applied to the detecting signals vfl, vfr, vrl, vrr. In normal cases, since the detecting signals from the vehicle speed sensors 2 to 5 contain noises, the low pass filter process is performed to the detecting signals to eliminate high frequency noises and the like contained in the detecting signals.

At S12, a wheel speed vf of the front wheel, a wheel speed vr of the rear wheel and a vehicle body speed Vb are calculated respectively. The wheel speed vf of the front wheels is determined by averaging the detected left and rear front wheel speeds vfl, vfr. Similarly, the wheel speed vr of the rear wheels is determined by averaging the detected left and rear wheel speeds vrl, vrr. On the other hand, the vehicle body speed Vb is obtained by averaging the front wheel speed vf and the rear wheel speed vr, that is, averaging the respective wheel speeds vfl, vfr, vrl, vrr. The vehicle body speed Vb may be determined by just averaging left and right wheel speeds of the driven wheels. Further, based on a rate of time versus change of thus calculated vehicle speed Vb, the deceleration Gx is calculated. Then, at a step 13, a difference between a slip ratio Sf of the front wheel and a slip ratio Sr of the rear wheel, that is, a difference of slip ratios between front and rear wheels Sfr is calculated.

Then, the program goes from S13 to S14 wherein it is judged whether or not the aforesaid execution condition is satisfied. The execution condition is a driving condition suitable for the calculation of the mean value Sfra of the calculated differences of slip ratios Sfr and the driving condition is specified as "the deceleration Gx of the vehicle is within a specified range (0.2G to 0.3G) and the output signal of the brake switch 6 is an ON-signal". The deceleration Gx can be calculated in the deceleration calculating section 9. If the execution condition is satisfied at S14, the program goes to S15. On the other hand, in case where the execution condition is not satisfied, the program leaves the routine.

The program goes to S15 where the calculated difference of slip ratios Sfr is stored in time series in RAM of the micro-computer. Then, at S16, a plurality of the stored differences of slip ratios Sfr are read out from RAM during a specified time (for example 1 second) and a mean value Sfra of these differences of slip ratios Sfr is calculated.

Then, at S17 following S16, it is judged whether or not the vehicle is in standstill. When the vehicle stops, the temperature of the front wheel becomes higher than that of the rear wheel and as a result the frequency region of the difference of slip ratios Sfr when being equipped with summer tires tends to shift in a direction increasing the difference of slip ratios Sfr, compared to the usual case. As a result, there is possibility that the tire type is erroneously judged. In order to avoid this, it is necessary to change the tire judgment value Cvari to an appropriate value. Hence, at a step 17, it is judged whether or not the vehicle is placed in such a situation as producing a difference of dynamic radiuses between front and rear wheels due to the temperature difference of wheels. Whether or not the vehicle is in standstill is judged based on the vehicle speed Vb. In case where it is judged at S17 that the vehicle is traveling, the program leaves the routine. In case where the vehicle is in standstill, the program goes to S18.

At S18, it is judged whether or not the type of the present tire is a summer tire. Since the tire judgment process which will be described hereinafter is performed more than once, the tire type is judged to be either of the summer tire and the studless tire. In case where the judgment process of the tire type has not been performed ever, either summer tire or studless tire is selected.

In case where it is judged that the tire type is a summer tire, the program goes to S19 where the tire judgment value Cvari is variably established according to the following patterns 1 to 5. The initial value of the tire judgment value Cvari is established to the reference value C1.

(1) In case where the present value of the tire judgment value Cvari is the reference value C1:
Pattern 1; When the mean value Sfra is larger than 0.004, Cvari is established to the new reference value C2.
Pattern 2; When the mean value Sfra is smaller than 0.004, Cvari is established to the reference value C1.

(2) In case where the present value of the tire judgment value Cvari is the new reference value C2:
Pattern 3; When the mean value Sfra is larger than 0.004, Cvari is established to the new reference value C2.
Pattern 4; When the mean value Sfra is smaller than 0.004, Cvari is established to the reference value C1.
Pattern 5; When the vehicle travels at 50 km/h or more for more than 5 minuites, Cvari is established to the original reference value C1.

On the other hand, in case where it is judged at S18 that the tire type is not a summer tire, that is, the tire type is a studless tire, the program goes to S20 where the tire judgment value Cvari is fixedly established to the reference value C1.

Figure 7:
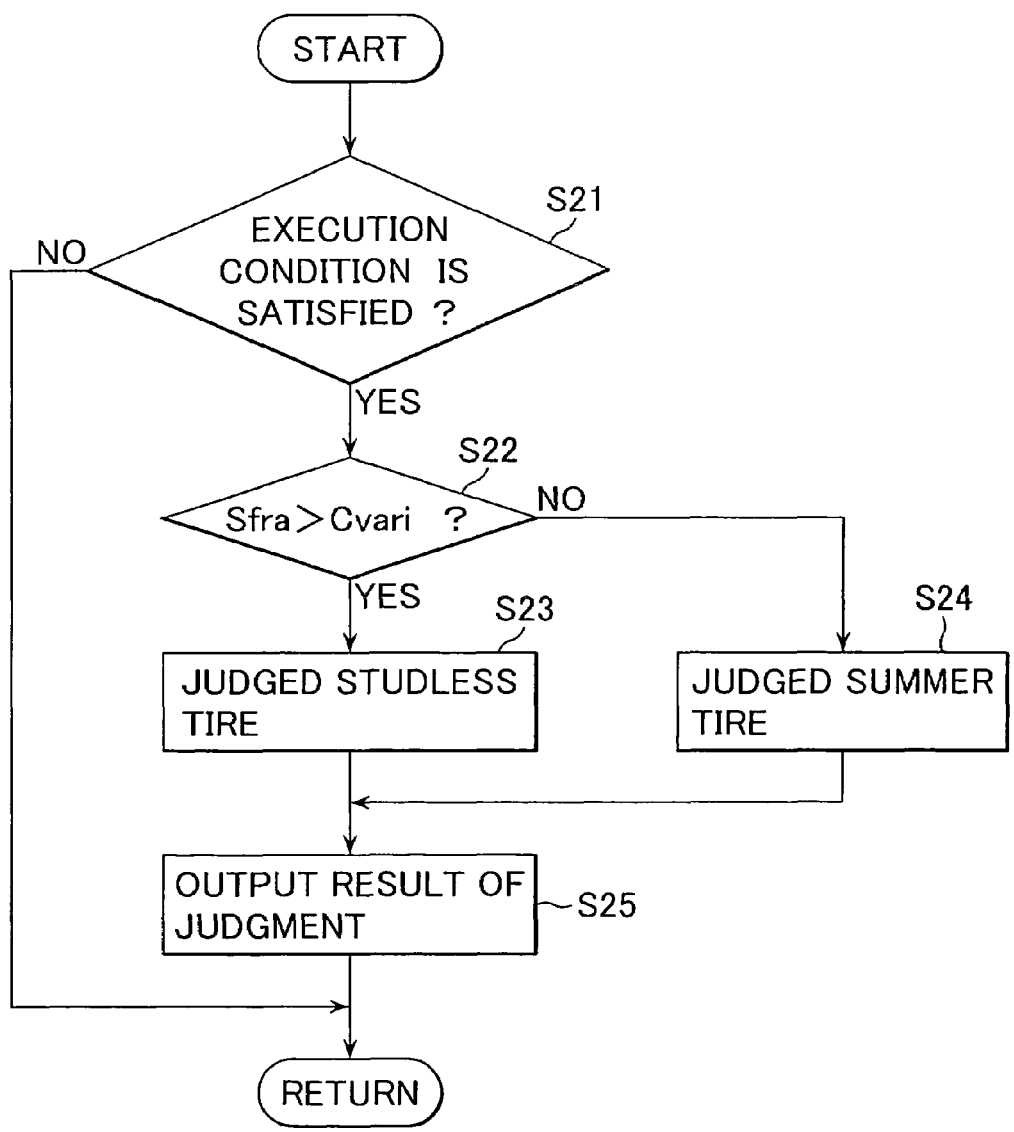
FIG. 7 is a flowchart showing a process for judging a type of tires.

FIG. 7 is a flowchart showing a detailed process for judging the type of tires. When the tire judging value Cvari is established at S19 or S20, it is judged at S21 whether or not the execution condition is satisfied. This execution condition is the same as that in the process of establishing the tire judging value Cvari. If the execution condition is not satisfied, the program leaves the routine. On the other hand, if the execution condition is satisfied, the program goes to S22.

At S22, it is judged whether or not the mean value Sfra of the differences of slip ratios Sfr is larger than the tire judgment value Cvari which has been established at S19 or S20. With respect to this mean value Sfra, the mean value Sfra calculated in S16 can be used as it is. Otherwise, in this routine, a new mean value Sfra may be calculated. In case where it is judged at S22 that the Sfra is larger than the tire judgment value Cvari, the program goes to S23 where it is judged that the tire type is a studless tire. On the other hand, in case where it is judged at S22 that the Sfra is smaller than the tire judgment value Cvari, the program goes to S24 where it is judged that the tire type is a summer tire.

At S25, the tire type judged is outputted, the program leaving the routine. This outputted type of tires is inputted to a road surface condition judging apparatus 40 and the like and is employed as information for judging the road surface condition by the road surface condition judging apparatus 30.

Thus, according to the second embodiment, under the condition that the execution condition is satisfied, the mean value Sfra of the difference of slip ratios Sfr is monitored. In case where this mean value Sfra exceeds approximate 0.004, the tire type judgment value Cvari is changed from the reference value C1 to the new reference value C2. Further, in case where there occurs a difference of dynamic radiuses between front and rear wheels, since the tendency of the difference of slip ratios Sfr changes, if the tire judgment value Cvari is fixedly established, erroneous judgments tend to occur. However, a threshold value can be established according to the tendency of the difference of slip ratios Sfr by estimating the difference of dynamic radiuses between front and rear wheels and changing the tire judgment value Cvari from the reference value C1 to the new reference value C2. As a result, in case where the vehicle is equipped with summer tires and there occurs a difference of dynamic radiuses between front and rear wheels, since the type of tires is hardly judged to be a studless tire erroneously, erroneous judgments of the tire type can be inhibited.

Further, in case where the difference of dynamic radiuses between front and rear wheels comes from a temperature difference between front and rear wheels, a temperature of front wheels and a temperature of rear wheels may be detected separately. In this case, the tire judging section 14 monitors the temperature of the front wheels and the temperature of the rear wheels when the type of tires is judged to be a summer tire. Then, in case where it is judged that the temperature of front wheels is a specified temperature or more (for example 40° C. or more) and the temperature difference between front and rear wheels is a second specified temperature or more (for example 10° C. or more), the tire judgment value Cvari is changed from the reference value C1 to the new reference value C2 on the frequency region side (broken lines in FIG. 5) with respect to the studless tire. The temperature of the front and rear wheels can be measured by a known non-contact type thermometer (for example, radiation thermometer). Further, since it is estimated that the difference of dynamic radiuses between front and rear wheels frequently happens when the radiator fan is operative, in case where the operating signal of the radiator fan is detected, the tire judgment value Cvari may be changed from the reference value C1 to the new reference value C2.

[Third Embodiment]

The third embodiment of the present invention is an example of a road surface condition judging apparatus using the type of tires established in the first and second embodiments. The road surface condition judging apparatus is an apparatus for judging a road surface condition, that is, a grip condition between tires and a road surface on which the vehicle travels presently, based on "the grip threshold values" described before.

Figure 9:
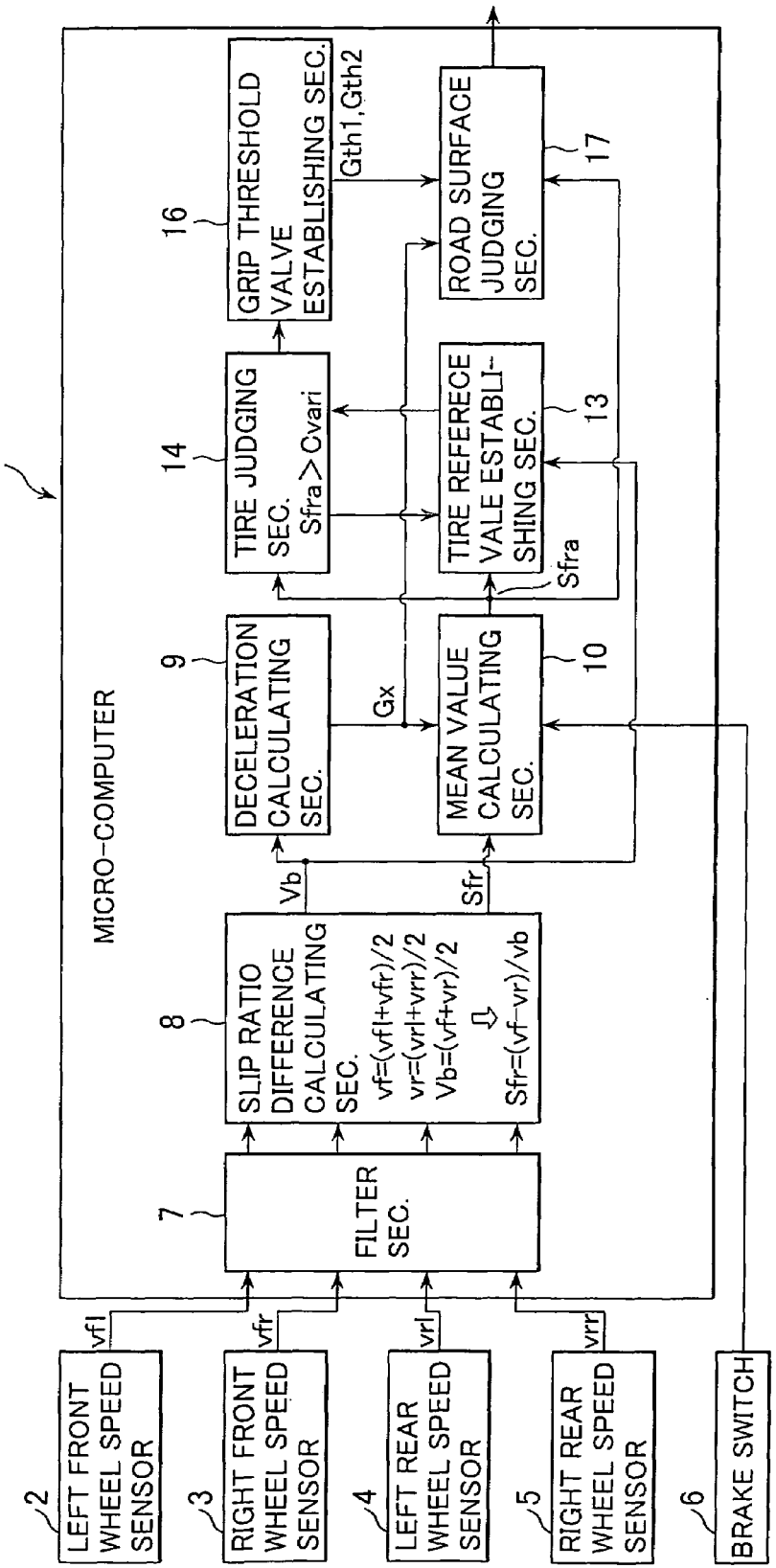
FIG. 9 is a block diagram of a road surface condition judging apparatus of a vehicle according to a third embodiment of the present invention.

Referring to FIG. 9, reference numeral 40 denotes a road surface condition judging apparatus for judging a grip condition between wheel and road surface and in this third embodiment, the grip condition is evaluated in three grades, high grip, medium grip and low grip. The road surface condition judging apparatus 30 is a micro-computer constituted by CPU, RAM, ROM, input and output interface and the like. The micro-computer performs miscellaneous calculations related to the grip judgment by software processes according to the control program stored in ROM.

The road surface condition judging apparatus 40 calculates the deceleration Gx in the deceleration calculating section 9 and the mean value Sfra of the difference of slip ratios between front and rear wheels Sfr in the mean value calculating section 10 in the same manner as in the first embodiment. The tire reference value establishing section 13 estimates the change of the dynamic radiuses of the rear wheel on the basis of the front wheel based on the calculated mean value Sfra and variably establishes the tire judgment value Cvari. The tire judging section 14 judges the type of tires, a studless tire or a non-studless tire by comparing the calculated mean value Sfra with the tire judgment value Cvari established by the tire reference value establishing section. Thus judged tire type is outputted to the grip threshold value establishing section 16 in which the grip threshold values Gth1, Gth2 are variably established. Further, when there is a change of the dynamic radius of the rear wheel on the basis of the dynamic radius of the front wheel, the grip threshold values Gth1, Gth2 are further variably established. The road surface judging section 17 judges the grip condition between tires and road surface by comparing the difference of slip ratios between front and rear wheels Sfr with thus established grip threshold values Gth1, Gth2.

Further, the road surface judging section 17 operates warning devices such as lamps and speakers when it is judged that the warning is necessary.

Below, a process of the road surface judgment will be described. The road surface judgment processes are executed at a specified time interval by the micro-computer in such an order, firstly the establishment of the tire judgment value Cvari, secondly the judgment of tire types and thirdly the judgment of road surface conditions.

Since processes of the establishment of tire judgment value Cvari and the judgment of the type of tires have been described in the second embodiment, the description of these processes will be omitted.

FIG. 10 is a flowchart showing a process of judging road surface conditions. First, at S26, it is judged whether or not the tire type judged in the tire judging section 14 of FIG. 9 is a summer tire. In case where the tire type is not a summer tire, that is, in case where the tire type is a studless tire, the program goes to S27 where the first and second grip threshold values Gth1, Gth2 are established at reference values illustrated by solid lines of FIG. 8, respectively. On the other hand, in case where it is judged at S26 that the tire type is a summer tire, that is, in case where it is judged that the tire type is a summer tire, the program goes to S28 in which, as illustrated by broken lines of FIG. 8, the first and second grip threshold values Gth1, Gth2 are established at values raised by Δ1 from the reference values, respectively.

Then, at S29 following S28, it is judged whether or not the tire judgment value Cvari is the new reference value C2. As described before, in case where there occurs a difference of radiuses between front and rear wheels, the tire judgment value Cvari has been changed over to the new reference value C2 such that the frequency region of the summer tire is enlarged to the right as illustrated in FIG. 5. That is, based on the present value of the tire judgment value Cvari, it is judged whether or not there occurs a difference of dynamic radiuses between front and rear wheels. In case where it is judged at S29 that the tire judgment value Cvari has been changed over to C2, that is, in case where there occurs a difference of radiuses between front and rear wheels, the program goes to S30 where the first and second threshold values Gth1, Gth2 are further raised by Δ2, as illustrated by one-dot chain lines of FIG. 8. On the other hand, in case where the tire judgment value is judged negatively at S29, that is, in case where there occurs no difference of radiuses between front and rear wheels, the program goes to S31.

At S31, the road surface judgment is made. Specifically, the present value of the difference of slip ratios Sfr calculated at S13 of FIG. 6 and the present value of the deceleration Gx calculated at S12 of FIG. 6 are compared with the first and second grip threshold values Gth1, Gth2. In case where the present difference of slip ratios Sfr is smaller than the first grip threshold value Gth1, it is judged that the road surface is in a high grip condition. Further, in case where the present difference of slip ratios Sfr is larger than the first grip threshold value Gth1 and the difference of slip ratios Sfr at a deceleration Gx of that moment is smaller than the second grip threshold value Gth2, it is judged that the road surface is in a medium grip condition. Further, in case where the difference of slip ratios Sfr at a deceleration Gx of that moment is larger than the second grip threshold value Gth2, it is judged that the road surface is in a low grip condition.

According to the third embodiment, the grip threshold vales Gth1, Gth2 are variably established according to the tire type and the change of the dynamic radius of the rear wheel on the basis of the dynamic radius of the front wheel. The grip condition between road surface and wheel scan be judged by comparing the difference of slip ratios Sfr with the grip threshold values Gth1, Gth2. Sometimes, the value of the difference of slip ratios Sfr appears in a grip judgment region different from intrinsic regions dependent upon the tire type (for example, summer tires belonging to non-studless tires). In this case, if the grip threshold values Gth1, Gth2 are fixedly established, erroneous judgments easily occur. However, the type of tires is judged and proper grip threshold values can be established by raising the grip threshold values Gth1, Gth2 from the reference values based on the judged tire type. As a result, in case where the vehicle travels on dry roads with summer tires, the medium grip judgment is difficult to be judged and erroneous judgments of the type of tires can be inhibited.

Further, in case where there occurs a difference of dynamic radiuses between front and rear wheels, sometimes the value of the difference of slip ratios Sfr appears in a grip judgment region different from intrinsic regions. Hence, proper grip threshold values can be established by further raising the grip threshold values. As a result, even in case where there occurs a difference of dynamic radiuses between front and rear wheels, it becomes difficult that the grip condition falls on a medium grip judgment region and the erroneous judgment of the tire type can be inhibited. In this embodiment, the change of the grip threshold value based on the type of tires is performed in the same program as the change of the grip threshold value based on the difference of dynamic radiuses between front and rear wheels, however these processes can be performed independently.

Further, in case where the difference of dynamic radiuses between front and rear wheels comes from a temperature difference between front and rear wheels, a temperature of front wheels and a temperature of rear wheels may be detected separately. In this case, the tire judging section 11 monitors the temperature of the front wheels and the temperature of the rear wheels when the type of tires is judged to be summer tire. Then, in case where it is judged that the temperature of front wheels is a specified temperature or more (for example 40° C. or more) and the temperature difference between front and rear wheels is a second specified temperature or more (for example 10° C. or more), the tire judgment value Cvari is changed from the reference value C1 to the new reference value C2 on the frequency region side (broken lines in FIG. 5) with respect to the studless tire. The temperature of the front and rear wheels can be measured by a known non-contact type thermometer (for example, radiation thermometer). Further, since it is estimated that the difference of dynamic radiuses between front and rear wheels frequently happens when the radiator fan is operative, in case where the operating signal of the radiator fan is detected, the tire judgment value Cvari may be changed from the reference value C1 to the new reference value C2.

What is claimed is:

1. A tire type judging apparatus of a vehicle for judging a type of tires, comprising:
    means for detecting wheel speeds of respective wheels of said vehicle;
    means for calculating a vehicle speed of said vehicle based on said wheel speeds of said respective wheels;
    means for calculating a deceleration of said vehicle based on said vehicle speed;
    slip ratio difference calculating means for calculating a difference of slip ratios between front and rear wheels based on said wheel speeds of said respective wheels and said vehicle speed;
    slip ratio difference representative value calculating means for calculating a representative value of said difference of slip ratios between front and rear wheels; and
    tire type judging means for judging a type of tires of said wheels when a preestablished condition is satisfied by comparing said representative value with a tire judgment value on which said type of tires is judged.

2. The tire type judging apparatus according to claim 1, wherein said representative value is a mean value of a plurality of differences of slip ratios between front and rear wheels stored during a specified time interval.

3. The tire type judging apparatus according to claim 1, wherein said preestablished condition is a condition that said vehicle is braked and said deceleration is within a specified range.

4. The tire type judging apparatus according to claim 1, wherein said tire judgment value is established beforehand based on a difference of frequency distributions of said difference of slip ratios between different types of tires.

5. The tire type judging apparatus according to claim 1, wherein said type of tires is one of a summer tire and a studless tire.

6. The tire type judging apparatus according to claim 3, wherein said range of said deceleration is a range established by a prior statistic process.

7. The tire type judging apparatus according to claim 3, wherein said range of said deceleration is a range from 0.2G to 0.3G approximately.

8. The tire type judging apparatus according to claim 1, further comprising:
    tire judgment value establishing means for variably establishing a tire judgment value on which a type of tires is judged according to a difference of dynamic radiuses between front and rear wheels; and
    wherein said tire type judging means judges a type of tires of said wheels when a preestablished condition is satisfied by comparing said representative value with said tire judgment value.

9. The tire type judging apparatus according to claim 1, further comprising:
    tire judgment value establishing means for variably establishing a tire judgment value on which a type of tires is judged to a first reference value when it is judged that there is no difference of dynamic radiuses between front and rear wheels and said tire judgment value is established to a second reference value when it is judged that there is a difference of dynamic radiuses between front and rear wheels; and
    wherein said tire type judging means judges a type of tires of said wheels to be a summer tire or a studless tire when a preestablished condition is satisfied by comparing said representative value with said tire judgment value.

10. The tire type judging apparatus according to claim 9, wherein said first reference value is established beforehand based on a difference of frequency distributions of said difference of slip ratios between a summer tire and a studless tire when it is judged that there is no difference of dynamic radiuses between front and rear wheels and wherein said second reference value is established beforehand based on a difference of frequency distributions of said difference of slip ratios between a summer tire and a studless tire when it is judged that there is a difference of dynamic radiuses between front and rear wheels.

11. The tire type judging apparatus according to claim 9, wherein said judgment whether or not there is a difference of dynamic radiuses between front and rear wheels is made by comparing said mean value with a threshold value established beforehand on the basis of a mean value of a frequency distribution of a difference of slip ratios when said vehicle is equipped with a summer tire.

12. The tire type judging apparatus according to claim 9, wherein said tire judgment value is established to the second reference value when a temperature of said front wheels is higher than a specified value and when a temperature difference between front and rear wheels is larger than a specified value.

13. The tire type judging apparatus according to claim 9, wherein said tire judgment value is established to the second reference value when a radiator fun operates.

14. A road surface condition judging apparatus of a vehicle for judging a grip condition between a road surface and wheels, comprising:
    means for detecting wheel speeds of said respective wheels;
    means for calculating a vehicle speed of said vehicle based on said wheel speeds;
    means for calculating a deceleration of said vehicle based on said vehicle speed;
    slip ratio difference calculating means for calculating a difference of slip ratios between front wheels and rear wheels based on said wheel speeds of said respective wheels and said vehicle speed;

slip ratio difference representative value calculating means for calculating a representative value of said difference of slip ratios;

tire judgment value establishing means for variably establishing a tire judgment value on which a type of tires is judged to a first reference value when it is judged that there is no difference of dynamic radiuses between front and rear wheels and said tire judgment value is established to a second reference value when it is judged that there is a difference of dynamic radiuses between front and rear wheels;

tire type judging means for judging a type of tires of said wheels to be a summer tire or a studless tire when a preestablished condition is satisfied by comparing said representative value with said tire judgment value;

grip threshold value establishing means for variably establishing a grip threshold value according to said tire type and a difference of dynamic radiuses between front and rear wheels; and road surface judging means for judging a road surface condition between said road surface and said wheels by comparing said difference of slip ratios with said grip threshold value.

15. The road surface condition judging apparatus according to claim 14, wherein said representative value is a mean value of a plurality of differences of slip ratios between front and rear wheels stored during a specified time interval.

16. The road surface condition judging apparatus according to claim 14, wherein said preestablished condition is a condition that said vehicle is braked and said deceleration is within a specified range.

17. The road surface condition judging apparatus according to claim 14, wherein said first reference value is established beforehand based on a difference of frequency distributions of said difference of slip ratios between a summer tire and a studless tire when it is judged that there is no difference of dynamic radiuses between front and rear wheels and wherein said second reference value is established beforehand based on a difference of frequency distributions of said difference of slip ratios between a summer tire and a studless tire when it is judged that there is a difference of dynamic radiuses between front and rear wheels.

18. The road surface condition judging apparatus according to claim 14, wherein said judgment whether or not there is a difference of dynamic radiuses between front and rear wheels is made by comparing said mean value with a threshold value established beforehand on the basis of a mean value of a frequency distribution of a difference of slip ratios when said vehicle is equipped with a summer tire.

19. The road surface condition judging apparatus according to claim 16, wherein said type of tires is one of a summer tire and a studless tire.

20. The road surface condition judging apparatus according to claim 16, wherein said range of said deceleration is a range established by a prior statistic process.

21. The road surface condition judging apparatus according to claim 16, wherein said range of said deceleration is a range from 0.2G to 0.3G approximately.

22. The road surface condition judging apparatus according to claim 14, wherein said grip threshold value is established statistically beforehand based on frequency distributions of said difference of slip ratios corresponding to said deceleration in accordance with a type of tires.

23. The tire type judging apparatus according to claim 14, wherein said tire judgment value is established to the second reference value when a temperature of said front wheels is higher than a specified value and when a temperature difference between front and rear wheels is larger than a specified value.

24. The tire type judging apparatus according to claim 14, wherein said tire judgment value is established to the second reference value when a radiator fun operates.

25. A method of judging a type of tires of a vehicle, comprising the steps of:

detecting wheel speeds of respective wheels of said vehicle;

calculating a vehicle speed of said vehicle based on said wheel speeds of said respective wheels;

calculating a deceleration of said vehicle based on said vehicle speed;

calculating a difference of slip ratios between front and rear wheels based on said wheel speeds of said respective wheels and said vehicle speed;

calculating a representative value of said difference of slip ratios between front and rear wheels; and judging a type of tires of said wheels when a preestablished condition is satisfied by comparing said representative value with a tire judgment value on which said type of tires is judged.

26. The method according to claim 25, wherein said representative value is a mean value of a plurality of differences of slip ratios between front and rear wheels stored during a specified time interval.

27. The method according to claim 25, wherein said preestablished condition is a condition that said vehicle is braked and said deceleration is within a specified range.

28. The method according to claim 25, wherein said tire judgment value is established beforehand based on a difference of frequency distributions of said difference of slip ratios between different types of tires.

29. The method according to claim 25, wherein said type of tires is a summer tire or a studless tire.

30. A method of judging a grip condition between a road surface and wheels for a vehicle, comprising the steps of:

detecting wheel speeds of said respective wheels;

calculating a vehicle speed of said vehicle based on said wheel speeds;

calculating a deceleration of said vehicle based on said vehicle speed;

calculating a difference of slip ratios between front wheels and rear wheels based on said wheel speeds of said respective wheels and said vehicle speed;

calculating a representative value of said difference of slip ratios;

variably establishing a tire judgment value on which a type of tires is judged to a first reference value when it is judged that there is no difference of dynamic radiuses between front and rear wheels and said tire judgment value is established to a second reference value when it is judged that there is a difference of dynamic radiuses between front and rear wheels;

judging a type of tires of said wheels to be a summer tire or a studless tire when a preestablished condition is satisfied by comparing said representative value with said tire judgment value;

variably establishing a grip threshold value according to said tire type and a difference of dynamic radiuses between front and rear wheels; and judging a road surface condition between said road surface and said wheels by comparing said difference of slip ratios with said grip threshold value.

31. The method according to claim 30, wherein said representative value is a mean value of a plurality of differences of slip ratios between front and rear wheels stored during a specified time interval.

32. The method according to claim 30, wherein said preestablished condition is a condition that said vehicle is braked and said deceleration is within a specified range.

33. The method according to claim 30, wherein said first reference value is established beforehand based on a difference of frequency distributions of said difference of slip ratios between a summer tire and a studless tire when it is judged that there is no difference of dynamic radiuses between front and rear wheels and wherein said second reference value is established beforehand based on a difference of frequency distributions of said difference of slip ratios between a summer tire and a studless tire when it is judged that there is a difference of dynamic radiuses between front and rear wheels.

34. The method according to claim 30, wherein said judgment whether or not there is a difference of dynamic radiuses between front and rear wheels is made by comparing said mean value with a threshold value established beforehand on the basis of a mean value of a frequency distribution of a difference of slip ratios when said vehicle is equipped with a summer tire.

35. The method according to claim 30, wherein said type of tires is a summer tire or a studless tire.

36. The method according to claim 30, wherein said grip threshold value is established statistically beforehand based on frequency distributions of said difference of slip ratios corresponding to said deceleration in accordance with a type of tires.

37. The method according to claim 30, wherein said tire judgment value is established to the second reference value when a temperature of said front wheels is higher than a specified value and when a temperature difference between front and rear wheels is larger than a specified value.

38. The method according to claim 30, wherein said tire judgment value is established to the second reference value when a radiator fun operates.

* * * * *